United States Patent Office 3,640,901
Patented Feb. 8, 1972

3,640,901
OXIDATIVE CONVERSION CATALYST
Darrell W. Walker, Bartlesville, Okla., assignor to
Phillips Petroleum Company
No Drawing. Filed Jan. 27, 1969, Ser. No. 794,372
Int. Cl. B01j *11/82*
U.S. Cl. 252—437   5 Claims

ABSTRACT OF THE DISCLOSURE

A catalyst for oxidative conversion comprising a tin oxide-phosphate complex in combination with a nonporous silica catalyst support having an average ultimate particle diameter of less than 1 micron, a surface area within the range of about 1 to 1500 square meters per gram and a density of less than about 0.2 gram per cubic centimeter, the complex being prepared by impregnating the carrier with stannous sulfate, drying, contacting the impregnated carrier with phosphoric acid and calcining.

---

This invention relates to catalyst supports.

In one of its specific aspects, this invention relates to supports for catalyst suitable for oxidative conversion reactions.

As used herein, "oxidative conversion reactions" are those in which olefins such as propylene, butene, pentene, and the like, are converted into diolefins and/or oxygenated compounds such as butadiene, isoprene, furans, furfural, acetaldehyde, pyrane, acetic acid, methacrylic acid, acrolein, methacrolein, crotonaldehyde, crotonic acid, acetone, ethanol, and the like. Such reactions also convert diolefins to oxygenated compounds and convert oxygen-containing compounds to compounds having a greater oxygen content.

Tin oxide-phosphate and other catalysts have been found to be an effective catalyst for such reactions. Certain additives, such as lithium or barium, eliminate the need for frequent regeneration of the catalysts. Conjunctively, catalyst supports are of significance inasmuch as the preferred catalysts are expensive and their use in the supported state reduces the volumetric requirement of the catalyst from that usage wherein the complete shape is composed of the expensive catalyst to that usage in which substantially only the surface layers of the shape is of the basic catalytic composition, but with no less of catalytic activity.

There has now been discovered the catalyst support material of this invention which unexpectedly acts to increase conversions and selectivities in oxidative conversion reactions above those realized when employing the same catalytic agent supported on conventional supports.

According to this invention, there is provided oxidative conversion catalyst which comprises an oxidative conversion catalytic agent and a nonporous, catalyst carrier, or support, the latter comprising a flame-hydrolyzed silicon dioxide having an average ultimate particle diameter of less than 1 micron, a surface area of about 1 to about 1500 square meters per gram and a density of less than about 0.2 gram per cubic centimeter.

Accordingly, it is an object of this invention to provide a catalyst support which increases conversion and selectivity in oxidative conversion processes.

It is another object of this invention to provide a catalyst which facilitates oxidative conversion processes.

The catalyst support which has been found to facilitate the action of conventional oxidative conversion catalytic agents is a nonporous silica prepared by the flame-hydrolysis of silicon halides such as silicon tetrachloride or silicon tetrafluoride. The support can be sintered into branched, chain like formations of submicroscopic particles having diameters from about 70 to about 500 angstroms as desired. The support has a preferred average particle diameter of less than 0.2 micron, a preferred density of less than about 0.1 gram per cubic centimeter, and a preferred surface area of about 50 to about 1000 square meters per gram.

The finished catalyst has a silica content of from about 5 to about 95 weight percent, preferably from about 50 to about 95 weight percent.

The catalytic agent which is supported by the catalyst carrier can be any catalyst conventionally employed in oxidative conversion reactions. Peferably, the catalytic agent will be a tin oxide-phosphate complex and the following discussion will be expressed in relation to this preferred embodiment without meaning to limit the invention thereto.

The catalytic agent which is deposited on te catalyst carrier can vary considerably in composition. On a carrier-free basis, its phosphorous content is from about 0.1 to about 16 percent by weight, preferably from about 0.1 to about 5 percent by weight. If the catalyst contains an alkali or alkaline earth metal, it is present from about 0.1 to about 43 weight percent, preferably from about 0.1 to about 5 weight percent. The tin content is from about 15 to about 80 weight percent, preferably from about 20 to about 78.6 weight percent. The balance of the catalytic material is composed of anions such as oxide, chloride, sulfate, and the like, that satisfy the valence requirements of the cation metals present.

The effectiveness of the support of this invention was evaluated in a series of oxidative butene-2 dehydrogenation runs. In each instance, an identical quantity of catalyst was evaluated at 1000° F. under identical conditions including olefin, air and steam space velocities, and length of run, but with different catalyst carriers or supports. Test conditions were representative of typical oxidative dehydrogenation processes. Results were evaluated in terms of butene conversion and selectivity to butadiene, determined by gas-phase chromatography. These latter values are expressed as weight percent, and were determined for each sample after reaction times of 15 minutes and 180 minutes. All catalysts were prepared by impregnating the support with an aqueous solution of stannous sulfate, drying at 100° C., treating with sufficient phosphoric acid to provide the indicated amount of phosphorus, and calcining overnight at about 1200° F.

Results were as indicated in Table I at gas hourly space velocities, that is, volume of feed per volume of catalyst charged per hour under standard conditions, of 200 for the butenes, 1000 for air, and 2400 for the steam:

TABLE I

| Run No. | Catalyst support | Catalyst support, wt. percent | Wt. percent catalytic agent, support free | | Catalyst support pore diameter, A. | Conversion/selectivity, wt. percent | |
|---|---|---|---|---|---|---|---|
| | | | Tin | Phosphorus | | At 15 min. | At 180 min. |
| 1 | Cab-O-Sil silica | 77 | 71 | 3 | Nonporous | 71/96.5 | 69/90.6 |
| 2 | do | 83 | 71 | 1.2 | do | 70/94 | 61/93 |
| 3 | P-S-G silica | 88 | 73 | 2.5 | 605 | 18/87 | 17/83 |
| 4 | do | 83 | 71 | 2.3 | 285 | 27/97 | |
| 5 | do | 83 | 71 | 2.5 | 109 | 14/96 | 13/96 |

Cab-O-Sil silica: Cabot Corporation, flame-hydrolyzed 99.9% SiO$_2$, 0.015-0.020 micron ultimate particle size, 180 m.$^2$/g. surface area, 0.05 g./cc. density.
P-S-G- silica: Pechiney-Saint-Gobain silica extrudates, having surface areas (m.$^2$/g.) of: Run 3, 40; Run 4, 135; Run 5, 355.

These data indicate that the catalyst support, or carrier, of this invention is superior to a conventional porous silica catalyst support at comparable concentrations of catalyst support, catalytic components and operating conditions.

These data are representative of results obtained in comparisons with other catalyst supports, at other operating conditions, and at other concentrations of catalytic agents.

What is claimed is:

1. A composition of matter consisting essentially of a nonporous silica carrier and a tin oxide-phosphate complex, said carrier having an average ultimate particle diameter of less than 1 micron, a surface area within the range of about 1 to about 1500 square meters per gram and a density of less than about 0.2 gram per cubic centimeter, said complex containing phosphorous in an amount within the range of about 0.1 to about 16 weight percent and tin in an amount within the range of about 15 to about 80 weight percent, said composition being prepared by contacting said silica carrier with aqueous stannous sulfate, drying the contacted carrier, contacting the dried carrier with phosphoric acid and calcining the phosphoric acid-contacted carrier to produce a catalyst active in oxidative conversion reactions.

2. The composition of matter of claim 1 in which an alkali or alkaline earth metal is present in said composition in an amount from about 0.1 to about 43 weight percent.

3. The composition of matter of claim 1 in which said silica carrier comprises flame-hydrolyzed silicon dioxide particles having diameters within the range of about 70 to about 500 A.

4. The composition of claim 1 in which said composition contains 77 weight percent carrier and said complex contains 71 weight percent tin and 3 weight percent phosphorus.

5. The composition of claim 1 in which said composition contains 83 weight percent carrier and said complex contains 71 weight percent tin and 1.2 weight percent phosphorus.

References Cited
UNITED STATES PATENTS

| | | | |
|---|---|---|---|
| 3,371,079 | 2/1968 | Peters et al. | 252—456 |
| 2,990,249 | 6/1961 | Wagner | 23—182 VX |
| 3,205,177 | 9/1965 | Orzechowski et al. | 252—454 X |
| 3,274,283 | 9/1966 | Bethell | 252—437 X |
| 3,320,329 | 5/1967 | Nolan | 252—437 X |

PATRICK P. GARVIN, Primary Examiner

U.S. Cl. X.R.

252—449; 260—533, 533 N, 604, 680 E